W. F. SHAW.
Steak Broiler.

No. 28,781. Patented June 19, 1860.

Witnesses: Francis Loring, William Strong

Inventor: Wm. F. Shaw

UNITED STATES PATENT OFFICE.

WILLIAM F. SHAW, OF BOSTON, MASSACHUSETTS.

IMPROVED APPARATUS FOR BROILING OR ROASTING BY GAS.

Specification forming part of Letters Patent No. 28,781, dated June 19, 1860.

*To all whom it may concern:*

Be it known that I, WILLIAM F. SHAW, of Boston, in the county of Suffolk and State of Massachusetts, have invented an Improvement in Apparatus for Broiling or Roasting by Gas or Hydrocarbon Vapors; and I do hereby declare that the same is fully described and represented in the following specification and the accompanying drawings, of which—

Figure 4:
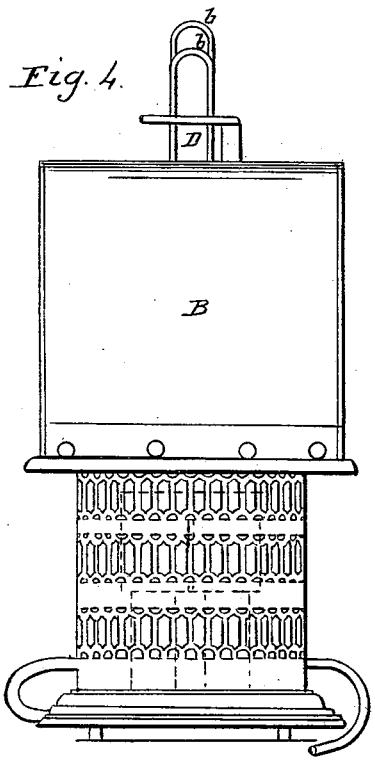
Figure 1:
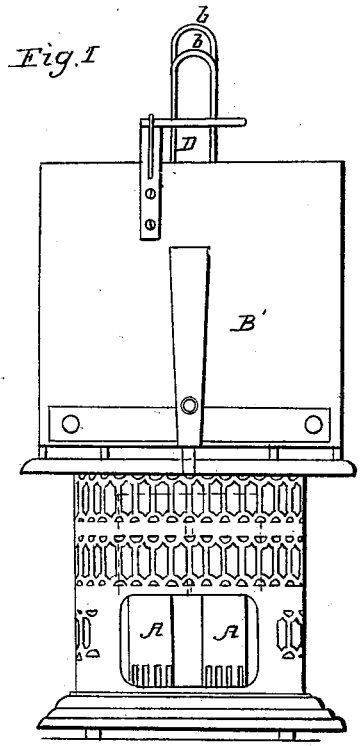
Figure 3:
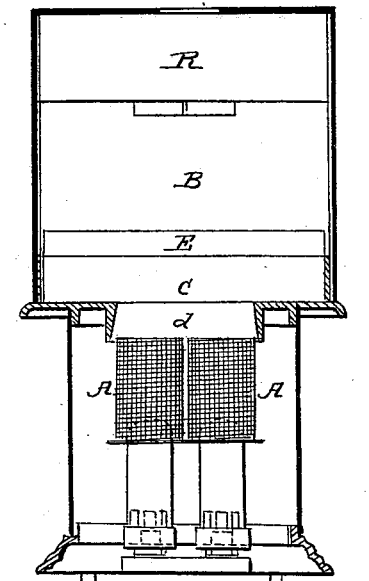
Figure 2:
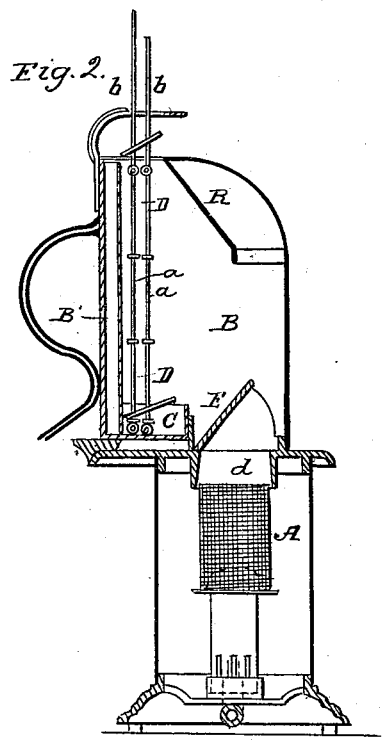

Figure 1 is a front elevation, Fig. 2 a transverse section, and Fig. 3 a longitudinal section, of my said improved apparatus. Fig. 4 is a rear view of the steak-holder and its supporter.

The nature of my invention consists in the arrangement of the steak-holder, the heating-chamber, and the burner or burners; also, in the arrangement of two deflectors in the heating-chamber and with respect to the burner or burners and the steak-holder when arranged as specified; also, in the combination of a closed air chamber or space with the steak-holder, the heating-chamber, and the burners arranged as specified.

In the drawings, A A exhibit two aerified gas-burners, arranged underneath and made to open into a heating or broiling chamber or vessel B, whose front vertical side or cover is constructed as a thin hollow box or chamber B', attached to a drip-pan or gravy-receiver C, the same being arranged as shown in the drawings. Against or alongside of the inner face of the said cover and within the heating-chamber a steak-holder D is placed, it being composed of two wire frames *a a*, hinged or connected together at or near one edge of each and furnished with handles *b b*.

When a steak or piece of meat or other food is to be cooked in the apparatus, it is first to be placed between the two wire frames *a a* and they are to be closed upon it so as to hold it upon opposite sides. Immediately over a long opening *d* made in the bottom of the heating-chamber, and under which the burners are placed, I arrange an inclined deflecting-plate E, causing the same to extend across the heating-chamber from end to end thereof. Furthermore, in the upper part of the said heating-chamber and over the said deflecting-plate I arrange another deflector or plate R, and in manner or with respect to the first, as shown in the drawings. By means of these deflectors and the arrangement of the steak-holder, the broiling-chamber, and the burner or burners I am able to obtain a more equal distribution of heat within the heating-chamber and less liability of burning the steak, and a better chance of collecting the gravy than when the steak-holder is placed horizontally over the burners. So with respect to the closed air chamber or space in the cover, it prevents the escape of heat from the steak and causes it to cook to better advantage than would a single plate.

I claim—

1. The arrangement of the steak-holder, the broiling-chamber, and the burner or burners.

2. The arrangement of the two deflectors with the heating-chamber and with respect to the burner or burners and the steak-holder, when arranged as specified.

3. The combination of the closed air chamber or space in the cover with the steak-holder and the heating-chamber, arranged as specified.

4. The combination of the vertical side or cover, with the steak-holder and drip-pan, said side or cover having a closed air chamber or space, as specified, and shown in drawings.

WM. F. SHAW.

Witnesses:
    J. FRANCIS LORING,
    WILLIAM STRONG.